UNITED STATES PATENT OFFICE

OSCAR KNECHT AND THEODOR WIRTH, OF BASEL, SWITZERLAND, ASSIGNORS TO THE FIRM CHEMICAL WORKS FORMERLY SANDOZ, OF BASEL, SWITZERLAND

MANUFACTURE OF MONOAZO-DYESTUFFS

No Drawing. Application filed May 10, 1929, Serial No. 362,148, and in Germany May 26, 1928.

Representatives of aminoarylsulphamides, in which both hydrogen atoms of the sulphamide group are replaced by identical or different aliphatic or aromatic residues, have been used for the manufacture of azo-dyestuffs. According to U. S. Patent No. 1,678,599 diazo compounds of amino-arylsulphamides of the above mentioned constitution, in which the amino group stands in ortho- or in meta-position to the sulphamide group, are combined with 2.3-hydroxy-naphthoic acid arylides, whereby insoluble dyestuffs are produced. In U. S. Patents Nos. 1,429,781 and 1,429,782 soluble azo-dyestuffs are described, obtainable by combining in acid solution with 2-amino-8-naphthol-6-sulphonic acid compounds or with 2-naphthylamine-8-sulphonic acids such diazotized 4-nitraniline sulphamides, in which the sulphamide group is substituted in a similar manner by alkyl or aryl groups.

It has been found that new azo-dyestuffs of excellent dyeing properties containing at least one halogen atom can be obtained by coupling diazotized 1-aminobenzene-3-sulphamides of the general formula:

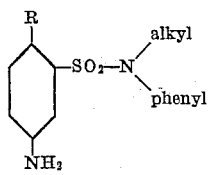

wherein R stands for H, alkyl or halogen, with a sulpho-1-phenyl-5-pyrazolonic compound of the general formula:

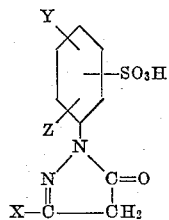

wherein X stands for —CH₃ or —COOH and wherein one or both of Y, Z stand for hydrogen or halogen.

The new dyestuffs constitute in a dry state yellow powders, easily soluble in water with a yellow coloration and dissolving in concentrated sulphuric acid with a yellow coloration. They dye wool from clear greenish yellow to yellow tints of excellent fastness to fulling, light and perspiration. Contrary to this result, the corresponding dyestuffs derived from 4-nitraniline-2-sulphoalkylarylides show an insufficient fastness to fulling and to perspiration, as their shade turns from yellow to red.

In order to illustrate the invention the following examples are given, the parts being by weight:

Example 1

310 parts of 1-aminobenzene-4-chloro-3-sulphoethylanilide melting at 104° C. (obtained by the action of 1-nitro-4-chloro-benzene-3-sulphonic chloride upon monoethylaniline and subsequent reduction) are diazotized in the usual manner. The diazo solution thus obtained is then allowed to run into a solution of 284 parts of 4'-sulpho-1-phenyl-3-carboxyl-5-pyrazolone in water, containing an excess of sodium carbonate. The dyestuff salted out and worked up as usual possesses the formula

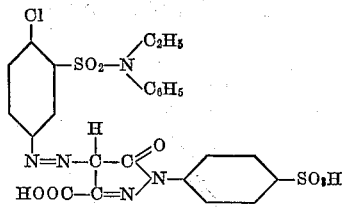

The dyestuff forms a yellow powder and dissolves in concentrated sulphuric acid with a brownish yellow and in water with a yellow coloration. It yields upon reduction 4-amino-1-chloro-benzene-2-sulphoethylanilide and 4-amino-4'-sulpho-1-phenyl-3-carboxyl-5-pyrazolone. It dyes wool clear yellow shades of good fastness to fulling, light and perspiration.

Example 2

290 parts of the hitherto undescribed 1-aminobenzene-4-methyl-3-sulphoethylanilide, melting at 108° C. (obtained by the action of 1-nitrobenzene-4-methyl-3-sulphonic chloride upon monoethylaniline and subsequent reduction) are diazotized in the usual manner. The diazo solution thus obtained is added to a solution of 323 parts of 4'-sulpho-2':5'-dichlor-1-phenyl-3-methyl-5-pyrazolone in water, containing an excess of sodium acetate. The resulting dyestuff shows the formula:

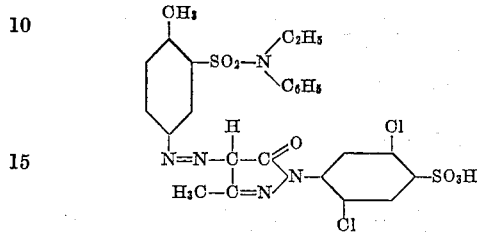

The dyestuff constitutes a yellow powder dissolving in concentrated sulphuric acid with a yellow and in water with a greenish yellow coloration. It yields upon reduction 4-amino-1-methylbenzene-2-sulphoethylanilide and 4-amino-4-'-sulpho-2':5'-dichlor-1-phenyl-3-methyl-5-pyrazolone. It dyes wool very clear greenish yellow shades of excellent fastness to light, perspiration and fulling.

What we claim is:

1. A process for the manufacture of monoazo dyestuffs, which contain at least one halogen atom, consisting in coupling diazotized 1-aminobenzene-3-sulphamides of the general formula:

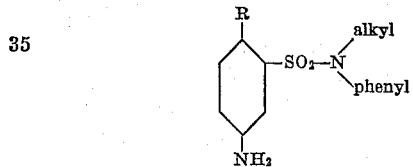

wherein R stands for hydrogen, alkyl or halogen, with a sulpho-1-phenyl-5-pyrazolonic compound of the general formula:

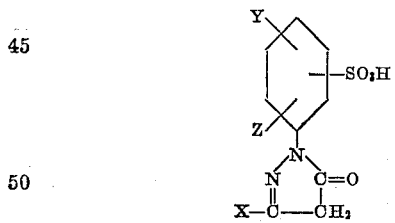

wherein X stands for $-CH_3$ or $-COOH$ and wherein one or both of Y, Z stand for hydrogen or halogen.

2. A process for the manufacture of monoazo dyestuffs, consisting in coupling diazotized 1-aminobenzene-3-sulphamides of the general formula:

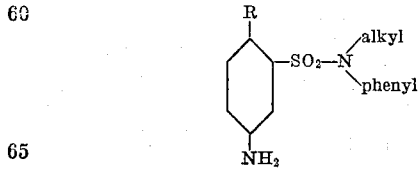

wherein R stands for hydrogen, alkyl or halogen, with halogenated 1-sulphophenyl-5-pyrazolone compounds of the general formula:

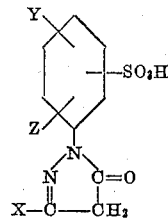

wherein X stands for $-CH_3$ or $-COOH$ and wherein one or both of Y, Z stand for halogen.

3. A process for the manufacture of monoazo dyestuffs, consisting in coupling diazotized 1-aminobenzene-3-sulphamides of the general formula:

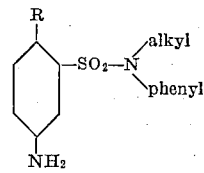

wherein R stands for hydrogen, alkyl or halogen, with 4'-sulpho-2':5'-dichloro-1-phenyl-3-methyl-5-pyrazolone of the formula:

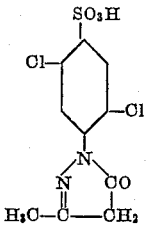

4. As new products, the monoazo dyestuffs, containing at least one halogen atom and corresponding to the following general formula:

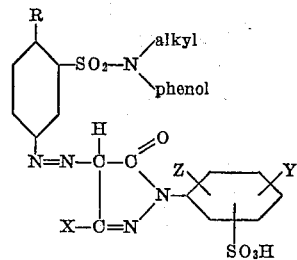

wherein R stands for hydrogen, alkyl or halogen, and X for $CH_3$ or $COOH$, and wherein one or both of Y, Z stand for hydrogen or halogen, said dyestuffs constituting in the form of their sodium salts yellow powders, dissolving in water with a yellow coloration and in concentrated sulphuric acid with a brownish coloration, dyeing wool greenish-yellow to yellow tints of excellent fastness to light, perspiration and fulling and yielding upon reduction 1-aminobenzene-3-sulphamides and 4-amino-1-sulphophenyl-5-pyrazolones.

5. As new products, the monoazo dyestuffs of the following general formula:

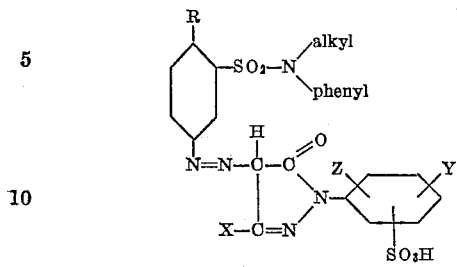

wherein R stands for hydrogen, alkyl or halogen, and X for CH$_3$ or COOH, and wherein one or both of Y, Z stand for halogen, said dyestuffs constituting in the form of their sodium salts yellow powders, dissolving in water with a yellow coloration and in concentrated sulphuric acid with a brownish yellow coloration, dyeing wool greenish yellow tints of excellent fastness to light, perspiration and fulling and yielding upon reduction 1-aminobenzene-3-sulphamides and halogenated 4-amino-1-sulphophenyl-3-methyl (or carboxyl) -5-pyrazolones.

6. As new products, the monoazo dyestuffs of the following general formula:

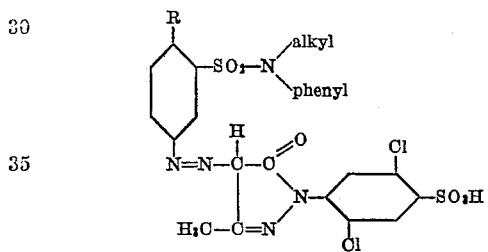

wherein R stands for hydrogen, alkyl and halogen, said dyestuffs constituting in the form of their sodium salts yellow powders dissolving in water with a yellow and in concentrated sulphuric acid with a brownish yellow coloration, dyeing wool greenish yellow tints of excellent fastness to light, perspiration and fulling and yielding upon reduction 1-aminobenzene-3-sulphamides and 4-amino-4'-sulpho-2':5'-dichloro-1-phenyl-3-methylpyrazolone.

In witness whereof we have hereunto signed our names this 30th day of April 1929.

OSCAR KNECHT.
THEODOR WIRTH.